United States Patent [19]
Meinerding

[11] Patent Number: 5,291,725
[45] Date of Patent: Mar. 8, 1994

[54] ROTARY MOWER BLADE

[76] Inventor: Wesley C. Meinerding, 4863 F Fulton Rd., NW., Canton, Ohio 44718

[21] Appl. No.: 943,021

[22] Filed: Oct. 9, 1992

Related U.S. Application Data

[63] Continuation-in-part of Ser. No. 812,829, Dec. 24, 1991, Pat. No. 5,167,109.

[51] Int. Cl.$^5$ .................. A01D 34/64; A01D 34/73
[52] U.S. Cl. .................. 56/295; 56/255; 56/DIG. 20
[58] Field of Search .......... 56/295, 255, DIG. 17, 56/DIG. 20

[56] References Cited

U.S. PATENT DOCUMENTS

| | | | |
|---|---|---|---|
| 2,924,059 | 2/1960 | Beeston, Jr. | 56/295 |
| 3,162,990 | 12/1964 | Cook | 56/295 |
| 3,538,692 | 11/1970 | Cope et al. | 56/295 |
| 3,998,037 | 12/1976 | Deans et al. | 56/295 |
| 4,079,578 | 3/1978 | Cornellier | 56/295 |
| 4,297,831 | 11/1981 | Pioch | 56/295 |
| 4,320,617 | 3/1982 | Fedeli | 56/295 |
| 4,429,518 | 2/1984 | Fedeli | 56/295 |
| 4,578,938 | 4/1986 | Genesco | 56/295 |
| 5,036,654 | 8/1991 | Malutich | 56/295 X |
| 5,056,605 | 10/1991 | Bond et al. | 56/295 X |

*Primary Examiner*—Stephen J. Novosad
*Attorney, Agent, or Firm*—Chenpatents

[57] ABSTRACT

A rotary lawn mower blade has a plurality of shredders with cutting edges affixed to the blade. The shredders provide additional cutting edges for fine shredding of vegetation. These shredders may be bolted, welded or cut out of the blade. A ridge is provided for aiding the grass clippings to drop to the ground.

10 Claims, 5 Drawing Sheets

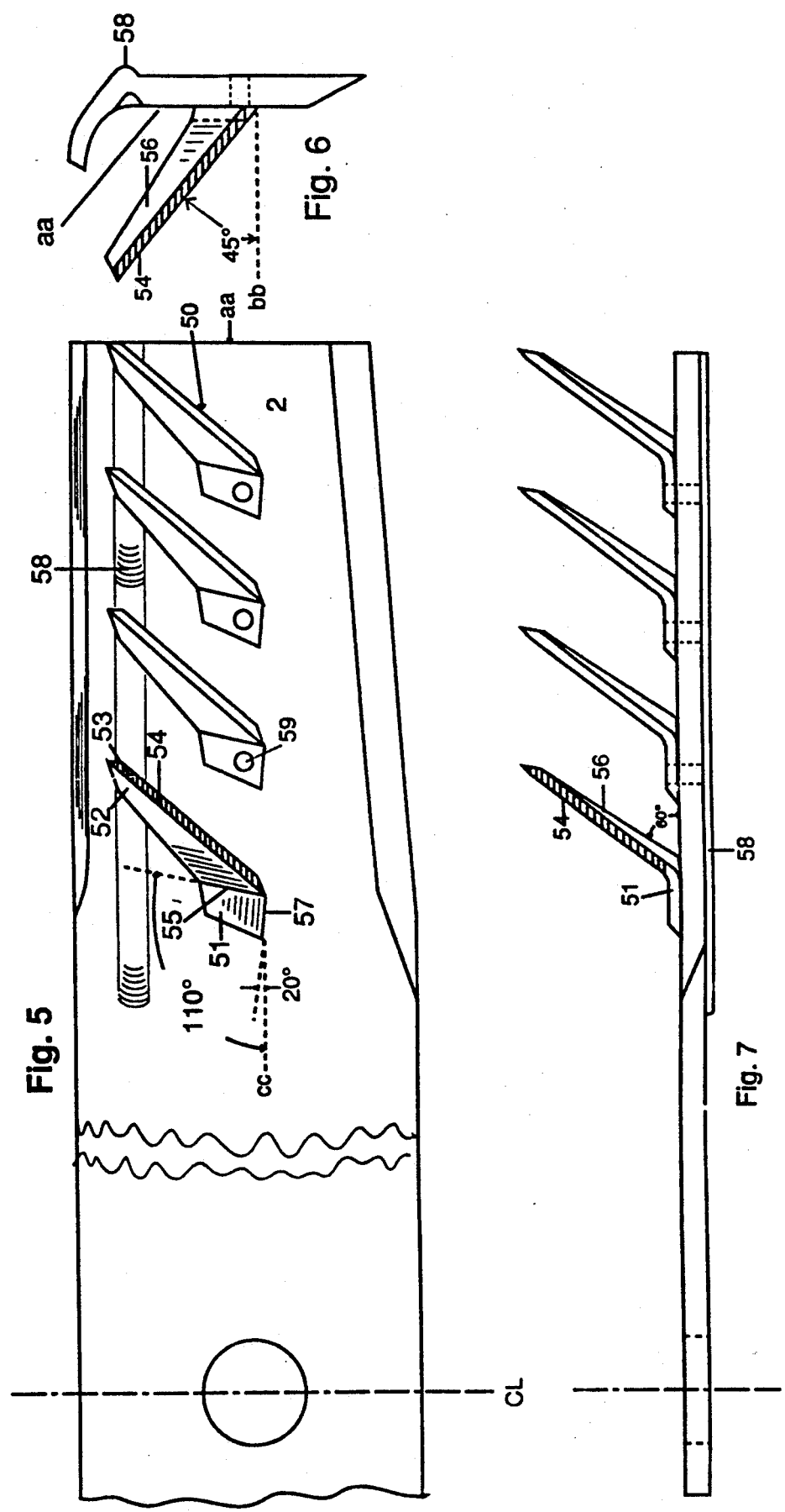

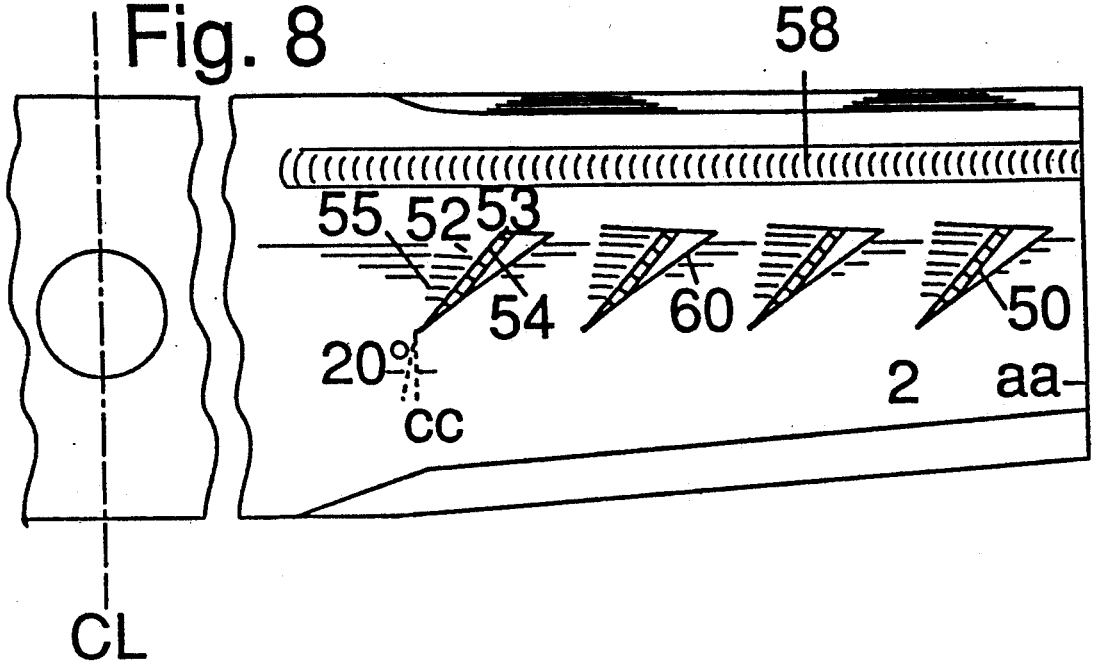
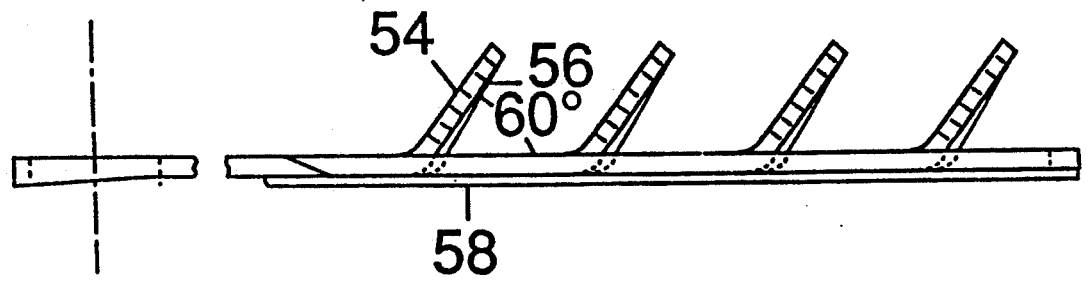
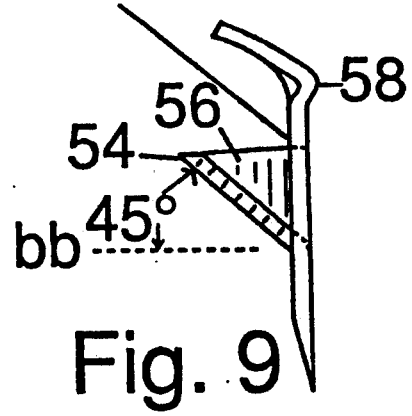

ROTARY MOWER BLADE

This is a continuation-in-part of an application, serial number 07/812,829 filed on Dec. 24, 1991, now U.S. Pat. No. 5,167,109.

BACKGROUND OF THE INVENTION

1. Field of Invention

This invention relates to an improved rotary mower blade having a plurality of small cutters, hereinafter referred to as shredders, affixed thereto for shredding vegetation such as grass, leaves or brush, to fine pieces. More particularly, this invention relates to a solid rotary mower blade having affixed thereunder, thereabove or a combination thereof, a plurality of cutter blades, arranged along the length of the rotary blade, to provide additional cutting edges which accomplish fine shredding of vegetation.

Power rotary lawn mowers, ordinarily used for cutting grass, have been recognized as a convenient means of collecting leaves and thin twigs. According to the U.S. Environmental Protection Agency (EPA), from 18% to 20% of landfill volume is used for the disposal of grass and leaves. It costs municipalities as much as $200 per ton to dispose of grass and leaves. The EPA further states that landfill disposal of grass and leaves will be prohibited in December 1993.

Fine shredding and composting of the finely-shredded vegetation in private gardens and on municipal compost piles is therefore desirable, yielding valuable humus for soil enrichment.

2. Prior Art

Many improvements have been made on rotary lawn mower blades to facilitate mowing or shredding, such as filaments and plastic discs with serrated peripheries. Some of the improved blades are disclosed in the following patents:

U.S. Pat. No. 4,706,446 discloses a rotary lawn mower having double cutting units, the upper one rotary and the lower one stationary. The two units are concentrically mounted and provided with cutting blades in the adjacent planes of the units such that the blades of the upper rotating unit act as shears against the lower stationary blades.

U.S. Pat. No. 2,917,826 discloses a disc of a lawn trimmer having pocket-like attachments with sharp edges, for edging grass along a side walk or flower bed while the disc is held with its edge perpendicular to the soil.

U.S. Pat. No. 5,056,605 relates to a multipurpose disc cutter having sharp saw teeth around its periphery, pointing upward and downward.

U.S. Pat. No. 4,270,271 discloses a trimmer having two discs concentrically held apart from each other so as to accommodate pivotally mounted and removable blades therebetween.

U.S. Pat. No. 4,295,274 relates to a floor scraper having a disc and a plurality of leaf spring strips having the shape of a Z, each mounted on the disc circumference at one end, the other end of the Z strip being equipped with a flat metal cutter having a front cutting edge facing in the direction of rotation of the disc, the rear side of the cutter being at a slight angle with respect to the plane of the disc.

U.S. Pat. Nos. 4,577,382 and 3,176,455 disclose rotary disc blades or bar blades with saw teeth with different orientations and additional apertures on the disc having one lateral edge as cutting edge so as to increase the cutting rate.

U.S. Pat. No. 5,063,731 relates to brush and tree cutter blades having three spring loaded teeth or slicing blades mounted on the periphery of the hinged blades such that if the teeth hit a hard surface, the teeth will retract within their cages and the blades will deflect upward or downward to avoid damage to the blades and saw teeth.

It is evident that the prior art has not addressed the problem of shredding vegetation into fine pieces during the mowing of lawns so as to speed the decomposition of the cuttings in contact with soil or in a compost pile.

SUMMARY OF THE INVENTION

The rotary mower blade of this invention allows grass clippings, leaves and twigs to be finely shredded, to be greatly reduced in bulk volume, and to decompose rapidly on the ground or in a compost pile. It is the object of this invention to provide a simple and economical rotary blade with at least one row of longitudinally spaced shredders attached on the underside, upper side, or a combination of both, of the rotary blade so as to provide a multitude of additional cutting edges. A further object is to provide shredders both above and below the rotary brush blade to accomplish fine shredding of vegetation.

The advantages and feature of the improved rotary blade will be apparent from reading of the detailed description of the preferred embodiments in conjunction with the drawings.

BRIEF DESCRIPTION OF THE DRAWINGS

FIG. 5 is a plan view of shredders welded or fastened onto a rotary blade.

FIG. 6 is an end view of a welded or fastened shredder.

FIG. 7 is an elevation of a welded or fastened shredders.

FIG. 8 is a plan view of shredders cut out from the main blade.

FIG. 9 is an end view of FIG. 8.

FIG. 10 is an elevation of FIG. 8.

DETAILED DESCRIPTION OF PREFERRED EMBODIMENTS OF THE INVENTION

Figure 1:
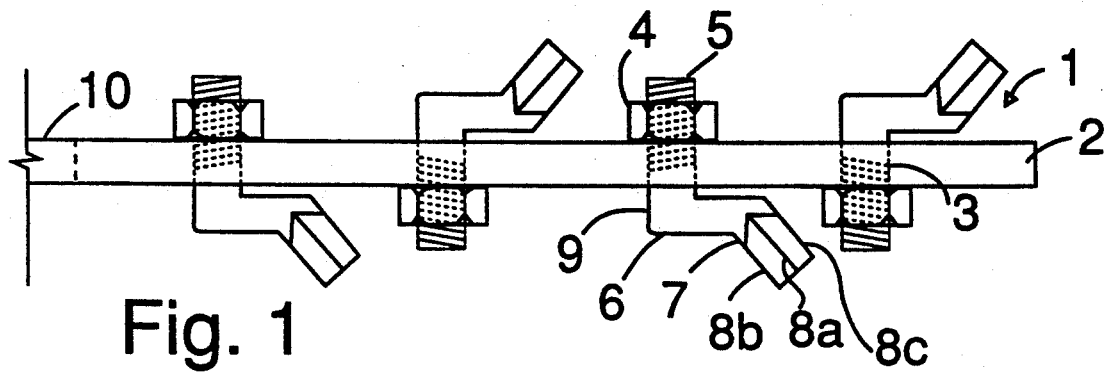
FIG. 1 is a side elevation of a rotary blade with a row of shredders with cutting edges.

Referring to FIG. 1, a rotary lawn mower blade generally denoted by 1, has a central bore 10, for attachment to a motor shaft. Only half of the blade is shown, the other half being a mirror image of the portion of the blade shown in this drawing. Blade 1 may be made of steel or hard plastic, such as polycarbonate, and may have a variety of shapes including that of a disc or a bar with a leading edge and trail up-lift wing. On blade 1, there is provided a row of apertures, 3, radiating from the central bore to the periphery of the blade. Into each of these apertures 3, an upper arm 5 of a shredder 9 is inserted. The upper arm 5, which is threaded at its upper extremity is secured by a lock nut 4. The diameter of arm 5 is slightly smaller than that of the aperture 3. The shredder 9 is thus free to rotate with respect to the rotary blade, 2. In an alternative embodiment, the arm 5 is rigidly fastened to the rotary blade, 2.

The shredders 9 are replaceable and are generally fastened to the underside of the blade 1. Each shredder is made of a metal bar, such as carbon steel, ⅛" to ¼" in diameter bent twice at approximately right angles to the horizontal arm 6 so as to have an upper vertical arm 5, a horizontal arm 6 connected thereto, and a lower vertical arm 7 connected to the horizontal arm 6. The arms 5, 6, and 7 form an integral part. The angle between arms 5 and 6 is preferably about 90 degrees; however a slight deviation from a right angle is acceptable. The angle formed by the arm 7 and the interconnecting arm 6 is preferably from 90 to 135 degrees. The length of the lower arm 7 should be about ½ to 1". The lower arm 7 and has at least one cutting edge along its vertical axis.

The lower arm 7 is preferably provided with several longitudinal cutting edges such as three sharpened cutting edges 8a, 8b and 8c as shown, by grinding the lower arm such that it has the cross section of an equilateral triangle.

Since the shredder is able to rotate freely with respect to the rotary blade, the lower arm does not sustain damage when it hits a stone. Therefore, the mower may be adjusted such that the lower extremities of the shredders are relatively close to the ground to provide maximum shredding action. The shredders are preferably made of carbon steel; alternatively, they may be moulded from a hard plastic such as polycarbonate.

The arrangement of the shredders on the rotary blade is preferably in a row radiating outward from the center of the rotary blade, as shown in FIG. 1 (only two shredders are shown for clarity).

Figure 2:
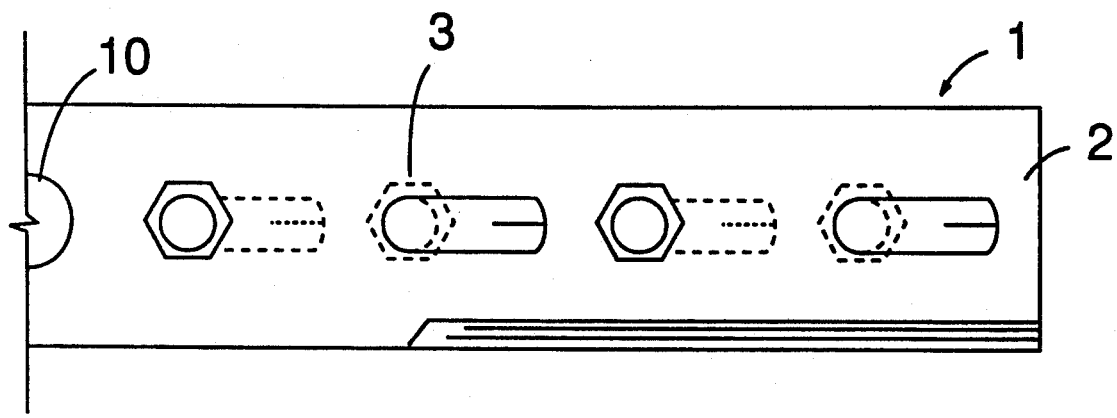
FIG. 2 is a plan view of the arrangement of shredders on a rotary blade.

Alternatively, as shown in FIG. 2, the shredders may be placed in two or more rows radiating from the center of the blade, or parallel to each other, at equal distances from each other and staggered from row to row.

Figure 3A:
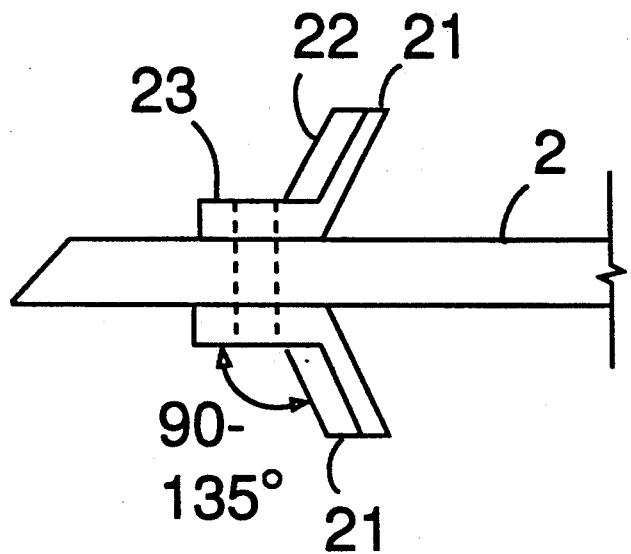
FIGS. 3a, 3b, and 3c illustrate another embodiment of the shredders.

In another embodiment, the shredder is made generally in the shape of a U as illustrated in FIGS. 3a, b, and c. Two arms 21 have longitudinal cutting edges, 22 and the interconnecting member 23 has an opening 24 through which the shredder is secured to the rotary blade by means of a bolt and lock nut (not shown). The arms 21 extend away from the interconnecting member 23 at an angle of 90 to 135 degrees as best seen in FIG. 3a which is side view of the two shredders being fastened above and below the blade.

Figure 3B:
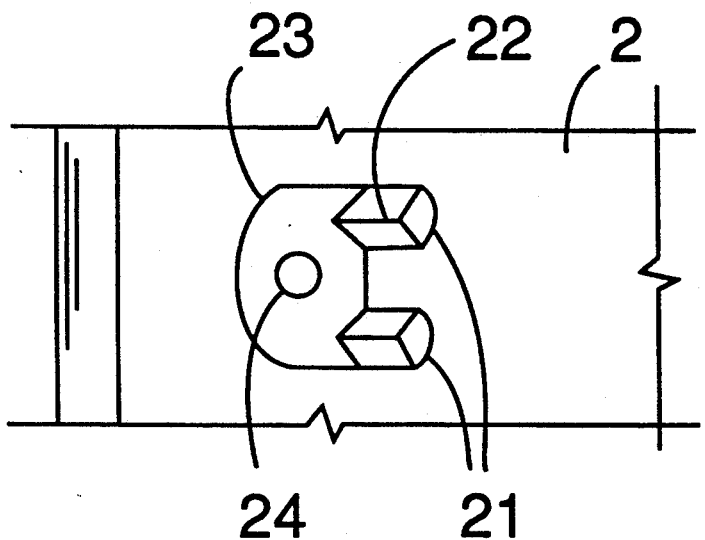
Figure 3C:
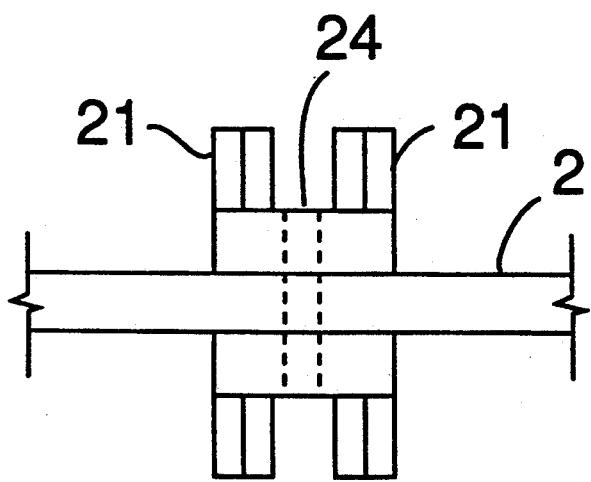

FIG. 3b is a plan view of this shredder which shows the two arms 21 having longitudinal cutting edges extending from the plane of connecting member 23 and blade 2. The extending shredder arms may be ground to have several longitudinal cutting edges as explained above. The shredder is attached to the rotary mower blade such that at least one of its cutting edges 22 points into the direction of motion as the mower blade rotates.

The shredders as described may be mounted only above or only below the rotary blade.

In all the above embodiments of the invention, the shredders may be restrained from rotating with respect to the rotary blade by means of square apertures on the blade and shredders and bolts having square shanks, such as carriage bolts, and lock nuts.

Figure 4A:
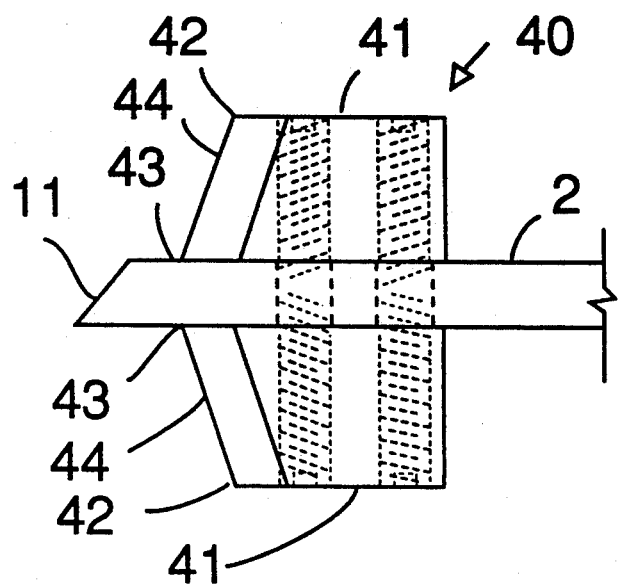
FIGS. 4a and 4b illustrate a shredder for a brush cutter blade including the shredders of this invention.
Figure 4B:
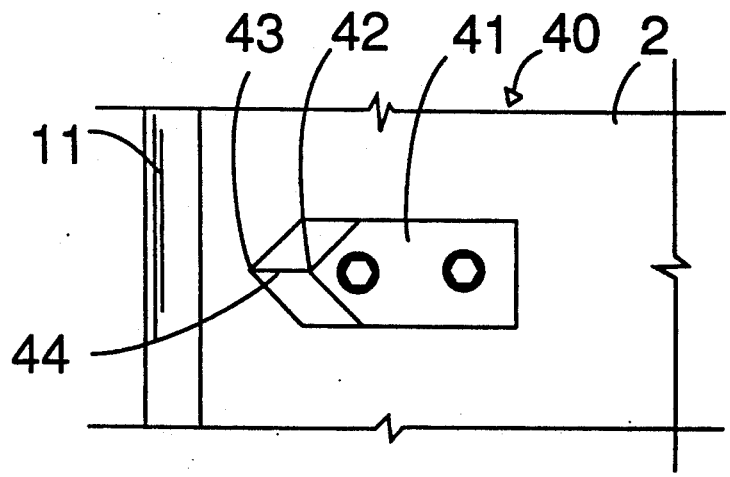

The shredder of this invention furthermore is useful as a brush cutter. Brush cutters generally have pivotally mounted blades to avoid damage by rocks, and the blade length varies from 15" to 24" depending on the size of cutter. FIG. 4b is a plan view of the shredder of this invention for brush cutters. The shredder 40 is a five-sided trapezoidal solid steel block about ⅛" to ¼" thick. The shredder is about 1"-2" long and ½" wide. The top surface 41 has a point 42 which is recessed with respect to its corresponding lower point 43 of the bottom surface (not shown). From point 42 to point 43 is an inclined cutting edge 44. The shredders are spaced along the cutting edge or leading edge 11, of the blade and on the upper side of the brush cutter blade 2, with the cutting edge 44 perpendicular to the cutting edge 11. The shredders may also be fixed on the underside of the cutter blade. Alternatively, shredders are fastened to the rotary blade in pairs, one shredder above the blade aligned with one below the blade, their mounting holes lining up and the blades being held in place by common bolts or pins having matching holes corresponding to those of the shredders. A roll pin or a split pin may be used. The number of shredders may be as high as six pairs on each half of the rotary blade. The number of cutting edges may thus be increased twelve-fold.

In another embodiment, the shredders are fabricated from metal plate of about one eighth (⅛") inch thickness and bent at an angle to form an inclined plate. Referring to FIG. 5, shredder 50, is provided with a base 51, which may be rectangular but is not limited to such configuration; and connected to the base 51 is an outwardly inclined plate having a front face 52 and a back face 56. The plate forms a 60-degree angle with respect to the surface of blade 2, as shown in FIG. 7. A front edge 54 of the shredder 50 is ground at a bevel, as shown in FIGS. 5, 6, and 7, to form a sharp cutting edge. Edge 54 slants backwards and is at a 45 degree-angle with respect to end 22 of the blade 2. As shown in FIG. 7, a portion of the rear edge of the blade 2 is slightly curved upward. As seen in FIG. 6, the edge 54 is at 45-degree angle with respect to the lawn mower blade end, aa, or the surface of the blade or with reference to a line bb, perpendicular to the surface of the blade 2 at the base of the inclined plate. As shown in FIG. 5, an intersecting line 55 between base 51 and face 52 is set on the blade at an angle of about 110 degrees with respect to a reference line, cc, which is perpendicular to the end aa of blade 2. To show the orientation of intersecting line 55 in another way, the front edge 57 of the base 51 is at an angle of about 20 degrees from the reference line cc.

The shredders are first spot welded onto the mower blade and then MIG welded all around. They may alternatively be provided with holes 59 for fastening the shredders to the blade with bolts and nuts. The shredders may be arranged in a row as shown, or they may be arranged in two rows.

In yet another embodiment, the shredders 50 may be constructed from the blade itself as shown in FIGS. 8, 9, and 10. Shredders 50 are cut from blade 2 and bent upward, similar to the configurations shown in FIGS. 5, 6, and 7. As shown in FIG. 8, shredder 50 has an inclined plate with a front face 52 being contiguous with blade 2, but in a different plane. A back face 56, and front face 52 form a front cutting edge 54. Bending the shredders upward as shown leaves triangular openings 60 in the mower blade.

FIG. 10 is an elevation of FIG. 8 showing face 56, which is inclined outwardly at a 60-degree angle with respect to the surface of the blade; the cutting edge 54 slants backwards and is at a 45-degree angle with respect to the end aa of the mower blade as shown in FIG. 9 or at a 45-degree angle with respect to reference line bb at the line of intersection 55. The face 52 is oriented at an angle such that the line of intersection 55 of the planes of the mower blade and that of the shredder is at a 20-degree angle with respect to a vertical line cc to the edge of the blade 2.

In addition to the latter two improvements above, elongated ridges 58 on the bottom surfaces of the blades 2 are provided, parallel to and near the rear edges of the blades, to provide brushing action causing the grass blades to straighten, to part the grass blades, and to allow the grass clippings to fall to the ground between the grass blades rather than settle on top of the cut grass. The ridges 58 may be extended inwardly from the end of the blades to at least the mid-point between the ends of the blades and the center. The ridges 58 are formed by deforming the metal of the blades so as to form ridges on the lower surfaces and concave grooves on the upper surfaces thereof.

With the use of the improved rotary mower blade of this invention, it has been found that a layer of leaves three feet deep is reduced to dust, fines and shredded cuttings ¾" in size and smaller with one mowing. Without the shredders of this invention, an ordinary rotary blade would produce cuttings 3 to 4" long. The shredding is accomplished by the additional cutting edges of the shredder of this invention while the clippings are being lifted to the discharge opening of the mower.

While only a limited number of embodiments has been described and shown herein, these are to be considered exemplary only, and numerous modifications may be made within the scope of the present invention which is to be limited only by the scope of the following claims.

What is claimed is:

1. An improved rotary lawn mower blade adaptable to a power lawn mower comprising:
   (a) a plurality of shredders each having an inclined plate contiguous to the blade, said inclined plate being cut from the blade and bent upward to incline outwardly at an angle of about 60 degrees with respect to the surface of the blade; and
   (b) a front cutting edge of the inclined plate slanting at an angle of 45 degrees with respect to a line perpendicular to the blade surface at an intersecting line between the blade and the inclined plate.

2. The blade of claim 1 wherein said inclined plate is cut out of the blade such that the line of intersection of the mower blade and the inclined plate is at an angle of at least about 20 degrees from a reference line perpendicular to the edge of the blade.

3. The blade of claim 2 further comprising an elongated ridge, near the rear edge of the blade and parallel thereto, to allow grass clippings to drop to the ground.

4. The blade of claim 1 wherein an elongated ridge extends from the end of the blade inwardly to at least the mid-point between the end of the blade and the center.

5. An improved rotary lawn mower blade adaptable to a power lawn mower comprising:
   (a) a plurality of shredders each having a flat base and an inclined plate, said inclined plate being inclined outwardly at an angle of about 60 degrees with respect to the surface of the blade;
   (b) a front cutting edge of the inclined plate slanting backwards at an angle of about 45 degrees with respect to a line perpendicular surface of the blade, and at the base; and
   (c) an elongated ridge, near the rear edge of the blade and parallel thereto, to allow grass clippings to drop to the ground.

6. The blade of claim 5 wherein the elongated ridge extends from the end of the blade inwardly to at least the mid-point between the end of the blade and the center.

7. The blade of claim 5 wherein said inclined plate is set on the blade in a manner such that an intersecting line between the base and the inclined plate is at an angle of at least about 110 degrees from a line perpendicular to the end of the blade and said shredders are welded on the blade at the base.

8. The blade of claim 7 wherein the elongated ridge extends from the end of the blade inwardly to at least the mid-point between the end of the blade and the center.

9. The blade of claim 5 wherein said inclined plate is set on the blade in a manner such that an intersecting line between the base and the inclined plate is at an angle of at least about 110 degrees from a line perpendicular to the end of the blade and said base is provided with a hole for fastening the shredder onto the blade.

10. The blade of claim 9 wherein said elongated ridge extends from the end of the blade inwardly to at least the mid-point between the end of the blade and the center.

* * * * *